Jan. 12, 1971 T. O. PAINE, DEPUTY 3,555,455
ADMINISTRATOR OF THE NATIONAL AERONAUTICS
AND SPACE ADMINISTRATION

METHOD AND APPARATUS FOR OPTICAL MODULATING A LIGHT SIGNAL

Filed Aug. 29, 1968

INVENTORS
William E. Richards &
Carl L. Gruber

BY

ATTORNEYS

3,555,455 METHOD AND APPARATUS FOR OPTICAL MODULATING A LIGHT SIGNAL

T. O. Paine, Deputy Administrator of the National Aeronautics and Space Administration, with respect to an invention of Carl L. Gruber, Rapid City, S. Dak., and William E. Richards, Burtonsville, Md.

Filed Aug. 29, 1968, Ser. No. 756,260
Int. Cl. G02f *1/28;* H01s *3/00*
U.S. Cl. 331—94.5 4 Claims

ABSTRACT OF THE DISCLOSURE

This disclosure describes a method and apparatus for optically modulating a light or microwave beam. The method comprises the steps of: generating a signal carrier light beam; directing said signal carrier light beam to a free carrier source that is normally transparent to said signal carrier bear; generating a modulating light beam, and directing the said modulating light beam to said free carrier source. The modulating light beam varies the transmission characteristics (transparency) of the free carrier source, thereby modulating the passage of the signal carrier light beam. The apparatus of the invention comprises a signal carrier light beam source, a modulating light beam source and a semiconductor free carrier source. Light beams from the signal carrier light beam source and from the modulating light beam source are directed onto the semiconductor free carrier source. The light from the modulating light beam source varies the transmission characteristics (transparency) of the semiconductor free carrier source to the light beam from the signal carrier light source, thereby modulating the signal carrier light beam. The transmission characteristics of the semiconductor free carrier source are varied by the creating of free carriers in it. The free carriers are created by the modulating light beam.

The invention described herein was made in the performance of work under an NASA contract and is subject to the provisions of Section 305 of the National Aeronautics and Space Act of 1958, Public Law 85–568 (72 Stat. 435; 42 U.S.C. 2457).

BACKGROUND OF THE INVENTION

Since the development of the laser, attempts have been made to modulate a laser beam so that a laser communications system can be developed. Electro-optical modulators that use either the natural or an induced birefringence of selected optical materials to split an incident polarized light beam into two separate beams have been developed. Each of the beams propagate with different velocities through the material. The relative velocities of the two beams, and therefore their phases, are modulated by an applied electric field. Magneto-optical modulators have also been developed. The magneto-optical modulator is basically the magnetic analog of an electro-optical modulator. The only difference is that the magneto-optical modulator uses magnetic materials and the Faraday rotation effect created by alternating magnetic fields to produce either phase or amplitude modulation.

Optical wave guide devices for modulating a laser beam have also been developed. These devices utilize junction diodes having junctions that are transparent to the incident radiation and bulk areas that are opaque to the incident radiation. The junction areas create "optical wave guides" whose dimensions can be varied by varying an external bias field. Electro-acoustic modulators wherein optical waves are modulated by passing acoustic waves across the wavefront of the incident optical waves have also been developed. The acoustic waves are created by generating electrical signals which are converted to acoustic waves by piezoelectric transducers, such as quartz, for example.

Another prior art modulator is the electrically depleted the band gap modulator. A band gap modulator varies the magnitude of the valence-conduction energy band gap of a material either by an electric field or by an injected carrier distortion technique. When the band gap is equivalent to the photon energy of an incident wave, absorption occurs. Hence, by varying the amount of absorption, modulation is created.

Another proir art modulator is the electrically depleted free carrier modulator. This device causes optical modulation by removing free carriers from the optical path of a laser signal. The effect is created by applying an AC field to ohmic contacts placed on thin films. The effect is critically dependent upon the thickness of the modulator material, i.e., the thin film.

While all of the foregoing modulation methods as illustrated by the described modulators have the ability to modulate a laser beam, they have inherent disadvantages. For example, electro-optical and magneto-optical modulators both require large amounts of drive power per unit bandwidth. Optical wave guide modulators and electrically depleted free carrier modulators have low power handling capabilities and low modulation indices. Electro-acoustical modulators have narrow information bandwidths. And, band gap modulators have low modulation indices. Because of these disadvantages modulators using the foregoing methods of modulation have only found limited use, in laboratories, for example. It is desirable to provide a modulation method and apparatus that overcomes these disadvantages so that laser modulators will have widespread use. More specifically, it is desirable to provide a modulation method and apparatus that overcomes the foregoing disadvantages, thereby making it feasible for a laser communications system to be developed.

Therefore, it is an object of this invention to provide a method and apparatus for modulating a laser beam having low drive power per unit bandwidth requirements.

It is also an object of this invention to provide a method and apparatus for modulating a laser beam having high power handling capability.

It is also an object of this invention to provide a method of varying the spatial distribution of a laser beam by nonuniform free carrier distributions.

It is another object of this invention to provide a method and apparatus for modulating a laser beam having a wide information bandwidth.

It is a further object of this invention to provide a method and apparatus for modulating a laser beam to effect a high modulation index.

It is yet another object of this invention to provide a method and apparatus for modulating a laser beam having a low drive power per unit bandwidth requirement, a high power handling capability, and a wide information bandwidth.

SUMMARY OF THE INVENTION

In accordance with a principle of this invention, a method for optically modulating a light beam is provided. The method comprises the steps of: generating a signal carrier light beam; directing said signal carrier light beam through a free carrier source that is normally transparent to said signal carrier light beam; generating a modulating light beam; and directing said modulating light beam onto said free carrier source.

In accordance with a further principle of this invencharacteristics of said free carrier source, thereby modulating the passage of said signal carrier light beam.

In accordance with another principle of this invention, the method of the invention also includes the step of combining the carrier light beam and the modulating light beam along a common axis prior to directing said beams to said free carrier source, or otherwise combining said beams at a common point on the surface of or in the siad free carrier source.

said free carrier source so as to vary the transmission tion an apparatus for optically modulating a light beam is provided. The apparatus comprises a signal carrier light beam generator and a modulator light beam generator. Each of the two generators generate a light beam and the two light beams are directed to a free carrier source. The free carrier source is transparent to the signal carrier light beam when the modulating light beam source is not generating a light beam but either varies the opacity to the signal carrier light beam or varies the phase of said signal carrier light beam when the modulating light beam source is generating a light beam. The relative opaqueness and/or phase change due to said free carrier source is related to the average incident power density of the light beam generated by the modulating light beam source.

In accordance with still another principle of this invention, a means for combining the two light beams and projecting them along a common axis can be included between the carrier light beam generator and the modulating light beam generator and the free carrier source.

In accordance with still another principle of this invention, the free carrier signal light beam source generarsenide. And, the signal carrier light beam source generates a light beam in the infrared or microwave frequency radiation range. The modulating light beam source may be a gallium arsenide injection laser while the signal carrier source may be a $CO_2$ laser, for exmple.

It will be appreciated from the foregoing description that the invention provides a method and apparatus for optically modulating a laser beam. The method comprises the steps of generating a signal carrier light beam and a modulating light beam, and directing both beams onto a free carrier source. The modulating light beam varies the index of refraction of the free carrier source to thereby either amplitude or phase modulate the carrier light beam. The apparatus is equally uncomplicated and comprises a pair of lasers—one laser generates a signal carrier light beam and the other laser generates a modulating light beam. The light beams from the two lasers are directed onto a free carrier source and the free carrier source's index of refraction is modulated by the modulating light beam, thereby modulating the signal carrier light beam. Alternatively, the free carrier source is integral with (on the surface of) one of the laser windows and the other laser beam is directed onto the free carrier source.

BRIEF DESCRIPTION OF THE DRAWINGS

The foregoing objects and many of the attendant advantages of this invention will become more readily appreciated as the same becomes better understood by reference to the following detailed description when taken in conjunction with the accompanying drawings wherein.

DESCRIPTION OF THE PREFERRED EMBODIMENTS

Figure 1:
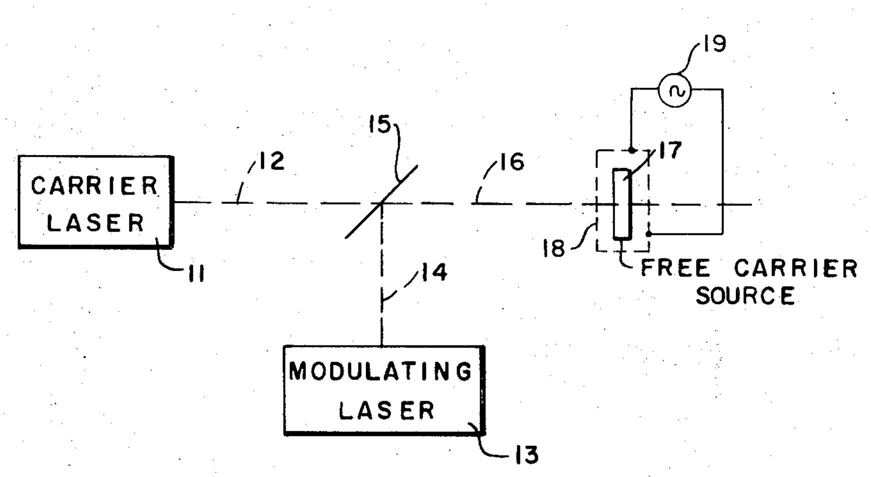
FIG. 1 is a schematic diagram illustrating one embodiment of the apparatus of the invention.

Prior to describing the invention, a brief description of the theory of the invention is hereinafter set forth. It is well known that the index of refraction of a material at a specific wavelength is a complex function (a function having a real and an imaginary part) of the number and spatial distribution of free carriers in the conduction band of the material. It is also known that the number of free carriers in the conduction band can be increased by the optical generation of electron-hole pairs in the material. Election-hole pairs are optically generated when the average incident photon energy supplied by a light beam is equal to or greater than the energy difference between the valence and conduction bands or interstitial sites and the conduction band of the material.

It will be appreciated from the foregoing theory, that free carriers control the passage of light through a material and that the number of free carriers can be increased by applying a light beam to the material. Because of these effects, the material (free carrier source) can be used to modulate a light beam. That is, by applying a free carrier generating light beam to the free carrier source, the passage through the free carrier source of light from a second light beam source is controllable. And, by varying the intensity of the free carrier generating light beam, the second light beam is modulated. Hence, the free carrier generating beam is a modulating beam while the second beam is a signal carrier beam. More specifically, the modulating beam controls the generation of free carriers in the material. And, the free carriers control the passage of the signal carrier beam. If the modulating beam does not vary, the signal carrier beam passes at a constant phase and amplitude. However, if the modulating light beam intensity is varied, the complex index of refraction which is related to the number of free carriers of the material is varied. This variation causes the signal passing through the material to be modulated either in intensity or phase depending upon the relation of the modulator intensity to the material parameters. The material parameters being: effective mass; diffusion coefficient; recombination relaxation time; doped carrier density; and mobility.

In general, the method of the invention comprises the steps of impinging a pair of light beams onto a semiconductor material. One light beam is a signal carrier light beam and the material is normally transparent to that beam. The second is a modulating light beam and creates free carriers in the material. The generation of free carriers (electron-hole pairs) in the material varies the transmission characteristics of the material with respect to the carrier beam. This variation in transmission characteristics (transparency or opaqueness) modulates the signal carrier beam so that the output from the material is a modulated signal carrier beam. More specifically, the method of the invention comprises the steps of: generating a signal carrier light beam; directing the signal carrier light beam to a free carrier source that is normally transparent to said signal carrier light beam; generating a modulating light beam; and directing said modulating light beam to said free carrier source so as to vary the opaqueness of said free carrier source. The method of the invention can include the additional step of combining the signal light beam and the modulating light beam and directing the two beams along a common axis to said free carrier source.

The method of the invention can be modified by applying electric potentials to surfaces of the free carrier source to vary the characteristics of the free carrier source, or by applying a magnetic field along the direction of propagation of the modulating light signal so that constrictions on the free carrier spatial distribution can be effected. The application of the magnetic field along the direction of propagation of the modulating light signal restricts free carrier diffusion to a path parallel to the direction of propagation of the modulated light, thereby causing the spatial distribution of the signal carrier beam to be further controlled. The electric or magnetic field generating elements are illustrated by a dashed box 18 (FIG. 1) connected to a signal generator 19. The signal generator controls the generation of the desired electric or magnetic field.

It will be appreciated from the foregoing description that the invention provides an uncomplicated method of optically modulating a laser beam that comprises the steps of: generating a signal carrier light beam; generating a modulating light beam; and directing both light beams to a free carrier source. The modulating light beam varies the number of electron-hole pairs in the free carrier source to control the passage of light from the signal carrier light beam. The following description describes preferred apparatus for carrying out the inventive method; however, it will be appreciated by those skilled in the art and others that other apparatus is also suitable for carrying out the method.

Turning now to a description of the preferred embodiment of the apparatus of the invention, FIG. 1 illustrates: a signal carrier laser 11; a modulating laser 13; a light beam combiner 15; and a free carrier source 17. The light beam combiner 15 is transparent to light from the signal carrier laser 11 and is reflective to light from the modulating laser 13. Hence, by suitably arranging the combiner, the carrier laser and the modulating laser, light from the signal carrier laser will pass through the light beam combiner and light from the modulating laser will be reflected by the combiner along the same axis. This arrangement is illustrated in FIG. 1. More specifically, the light beam combiner is mounted at 45° to the axis of the light beam 12 from the signal carrier laser 11 and at 45° to the axis of the light beam 14 from the modulating laser 13. The combined beams pass along a combined axis 16. The free carrier source 17 is located along the combined axis 16.

Turning now to a description of the operation of the embodiment of the invention illustrated in FIG. 1, the signal carrier laser 11 may be a $CO_2$ laser that generates a signal of 10.6 microns while the modulating laser 13 may be a gallium arsenide injection laser that generates a signal of 0.9 micron, for example. The light beam combiner may be formed of germanium and the free carrier source may be formed of gallium arsenide doped with iron, for example. For the 10.6–0.9 micron lasers, the light beam combiner must be formed so as to pass a beam of 10.6 microns and reflect a beam of 0.9 micron. Formation of such a light combiner will be obvious to those skilled in the art; hence, it will not be discussed here.

As stated above, the free carrier source can be formed of gallium arsenide doped with iron. If this material is doped so as to have a resistivity of $10^6$ ohm-cm. in its quiescent state, it is transparent to light in the 1.5 to 12 micron range. Because this range includes 10.6 microns, the light beam generated by the signal carrier laser passes through the free carrier source unmodulated; that is, the free carrier source is transparent to a 10.6 micron light beam. In addition, gallium arsenide doped with iron having a resistivity of $10^6$ ohm-cm. is not transparent to the modulating light beam signal because that beam is 0.9 micron. However, 0.9 micron radiation creates free carriers in the free carrier source. These free carriers vary the transparency of the free carrier source to the 10.6 micron radiation. Now, if the intensity of the incident 0.9 micron radiation is varied by varying the junction potential of the gallium arsenide laser, the number of free carriers generated in the free carrier source is varied. This variation modulates the transparency of the free carrier source to, in turn, modulate the 10.6 micron radiation in either amplitude and/or phase depending on the other parameters of the free carrier source discussed above.

From the foregoing it will be appreciated that, in addition to an uncomplicated method, the invention also provides an uncomplicated apparatus for optically modulating a light or microwave beam. The apparatus requires no wires or electrical connections to the point of modulation. In addition, modulator drive power requirements are independent of frequency and bandidth and lower power is required for the same bandwidth obtained with other modulation methods at the same signal carrier frequency. For example, it has been found that the drive power requirement for the foregoing 10.6–0.9 micron device is three watts for a 100 mHz. bandwidth, whereas prior art optical modulators require approximately 20 kilowatts for that bandwidth. In addition, the efficiency of the foregoing specific embodiment of the invention is 7.5% whereas other optical modulators have an efficiency of about $6\times10^{-3}$%. Hence, the overall power efficiency of the invention as opposed to prior art modulators is over 1000%. From this brief comparison of the improved results of the invention over prior art methods and apparatus, it will be appreciated that the invention results in optical modulators that are suitable for use where prior art modulators were unsuitable. For example, because of the reduction in power requirements for the same bandwidth and the increased efficiency, the invention allows lasers to be used in communication systems where high powered sources are not located, such as on a spacecraft, for example.

Figure 2:
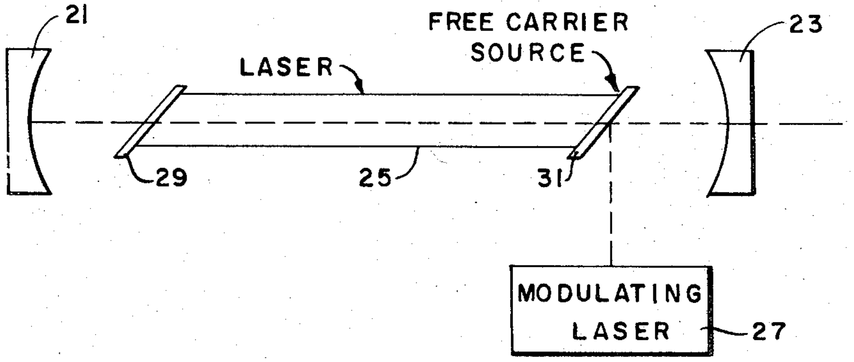
FIG. 2 is a schematic diagram illustrating a second embodiment of the apparatus of the invention.

FIG. 2 illustrates an alternative embodiment of the invention wherein the modulating laser beam is directly injected into the carrier laser. Specifically, the embodiment of the invention illustrated in FIG. 2 comprises a first reflecting mirror 21; a second reflecting mirror 23; a carrier laser 25; and a modulating laser 27. The signal carrier laser 25 has a transparent window 29 located at one end and a free carrier source window 31 located at the other end. In a conventional manner, by means not illustrated, the signal carrier laser 25 generates a carrier light beam that is reflected between the two mirrors 21 and 23. The carrier light beam is modulated by the modulating laser beam at the free carrier source end of the signal carrier laser. As in the embodiment illustrated in FIG. 1, the modulating light beam controls the transparency of the free carrier source so as to control the amount of carrier light passing through the free carrier source. Preferably, the second mirror 23 is transparent to the modulated carrier light so that the modulated light passes through the second mirror.

It will be appreciated by those skilled in the art and others that various modifications can be made within the scope of the invention. That is, other laser sources than those generating 10.6 and 0.9 microns can be used. And, other combiners and free carrier sources operating in other micron ranges (both visible light and microwave) can be used to carry out the invention. Hence, the invention can be practiced otherwise than as specifically described herein.

What is claimed is:

1. A method of optically modulating a laser beam comprising the steps of:
- generating a carrier laser beam;
- generating a modulating beam;
- superimposing said carrier laser beam and said modulating beam along a common axis upon a semiconductor material, the index of refraction of said semiconductor material being a function of the presence of free carrier electrons in the conduction band of said material and variable as a function of the intensity of said modulating beam such that in the absence of said modulating beam said material is transparent to said carrier;
- varying the intensity of said modulating beam to change the index of refraction of said material parallel to the path of said carrier to synchronously modulate the carrier laser beam passing through said material without deflecting it.

2. A method of optically modulating a laser beam as claimed in claim 1 wherein said carrier laser beam is generated at a frequency of 10.6 microns and said modulating beam is generated at a frequency of 0.9 micron.

3. A method of optically modulating a beam as claimed in claim 2 including the step of combining said signal carrier laser light beam and said modulating laser light beam prior to directing said light beams to said free carrier source.

4. A method of optically modulating a laser beam as claimed in claim 1 including the step of applying a magnetic field to said semiconductor along the direction of propagation of the modulating beam to restrict free carrier diffusion to a path parallel to the direction of propagation of the modulated carrier beam.

References Cited

UNITED STATES PATENTS

| | | | |
|---|---|---|---|
| 3,126,485 | 3/1964 | Ashkin et al. | 250—199 |
| 3,265,977 | 8/1966 | Wolff | 330—4.3 |
| 3,300,653 | 1/1967 | Boyd et al. | 331—94.5X |

OTHER REFERENCES

Gunn, "Light Modulator and Optical Logical Devices," IBM Tech. Disc. Bultn., vol. 7, No. 12, May 1965, pp. 1202–5.

RONALD L. WIBERT, Primary Examiner

P. K. GODWIN, Assistant Examiner

U.S. Cl. X.R.

350—160; 250—199; 332—7.51